United States Patent [19]

Soeding

[11] 4,179,532
[45] Dec. 18, 1979

[54] PROCESS FOR PRODUCING A DISC-SHAPED INFORMATION CARRIER WHICH HAS INFORMATION IN THE FORM OF A BEAM-REFLECTING STRUCTURE

[75] Inventor: Horst Soeding, Hanover, Fed. Rep. of Germany

[73] Assignee: Polygram GmbH, Hamburg, Fed. Rep. of Germany

[21] Appl. No.: 897,279

[22] Filed: Apr. 17, 1978

Related U.S. Application Data

[62] Division of Ser. No. 784,522, Apr. 4, 1977, Pat. No. 4,126,726.

[30] Foreign Application Priority Data

Apr. 9, 1976 [DE] Fed. Rep. of Germany ....... 2615605

[51] Int. Cl.² ............................................. B05D 3/06
[52] U.S. Cl. .................... 427/54.1; 101/32; 264/25; 264/107; 274/41.6 R; 346/135.1; 427/209; 427/277; 427/302; 427/304; 427/358; 427/404; 427/409
[58] Field of Search ............... 427/44, 209, 54, 146, 427/409, 304; 106/37; 346/135, 137; 274/41 A, 42 R, 42 P, 41.6 PP, 41.6 R, ; 360/135; 29/169.5; 204/5; 84/461; 264/106, 22, 107, 25, 293; 428/163, 164, 165, 409, 913; 101/32; 156/209, 272, 220

[56] References Cited

U.S. PATENT DOCUMENTS

| | | | |
|---|---|---|---|
| 2,370,562 | 2/1945 | Meunier | 18/47.5 |
| 3,260,612 | 7/1966 | Dulmage et al. | 427/53 X |
| 3,265,776 | 8/1966 | Henkes, Jr. | 264/1 |
| 3,430,996 | 3/1969 | Gregg | 274/42 |
| 3,518,442 | 6/1970 | Johnson | 260/219 |
| 3,658,620 | 4/1972 | Hall | 156/272 |
| 3,658,945 | 4/1972 | Broadbent | 264/1 |
| 3,674,591 | 7/1972 | Boyd, Jr. | 156/272 |
| 3,795,534 | 3/1974 | Mehalso et al. | 264/106 X |
| 3,893,127 | 7/1975 | Kaplan et al. | 427/44 X |
| 3,968,326 | 7/1976 | Nosker et al. | 178/66 R |
| 4,018,937 | 4/1977 | Levine et al. | 427/43 |
| 4,020,278 | 4/1977 | Carre et al. | 358/128 |
| 4,027,330 | 5/1977 | Maslowski et al. | 358/128 |
| 4,069,360 | 1/1978 | Yanagisawa et al. | 428/429 X |

FOREIGN PATENT DOCUMENTS

1446009 8/1976 United Kingdom .

Primary Examiner—Michael F. Esposito
Assistant Examiner—Thurman K. Page
Attorney, Agent, or Firm—Hill, Van Santen, Steadman, Chiara & Simpson

[57] ABSTRACT

A disc-shaped information carrier for high-density storage, in particular for video signals, has the information provided on both sides of the carrier and stored in the form of a beam-relfecting surface structure which is covered by a layer of translucent material. A disc-shaped base element is formed by injection molding, pressing, stamping or the like to exhibit a surface structure corresponding to the information to be stored on both sides thereof. Each side has a thin metallic coating applied thereto which maintains the same surface profile and the information structure is protected on each side with a layer of transparent material.

8 Claims, 4 Drawing Figures

PROCESS FOR PRODUCING A DISC-SHAPED INFORMATION CARRIER WHICH HAS INFORMATION IN THE FORM OF A BEAM-REFLECTING STRUCTURE

This is a division of application Ser. No. 784,522, filed Apr. 4, 1977, now U.S. Pat. No 4,126,726.

BACKGROUND OF THE INVENTION

1. Field of the Invention

The present invention relates to an information carrier for high-density storage, in particular for the storage of video signals, in which the information is provided on both sides of the carrier and stored in the form of a beam-reflecting surface structure which is covered, in each case, by a layer of translucent material.

2. Description of the Prior Art

An information carrier of the type mentioned above is known in the art, for example reference may be taken to the German published application No. 2,341,338, which corresponds to the British Pat. No. 1,446,009 of Aug. 11, 1976 and the Australian Pat. No. 5,974,573 of Mar. 6, 1975. This prior information carrier comprises two separate discs of transparent material which are connected together by an intermediate layer and having their respective sides provided with a beam-reflecting surface structure each of which faces the other. With this structure, the information is read by an optical scanning beam which penetrates from the outside through the transparent carrier layer to the beam reflecting surface, where the beam is reflected and modulated according to the profile of the beam-reflecting surface. Here, the thickness of the transparent carrier layer is not particularly critical because the scanning beam is focused as precisely as possible in the information plane. However, considerable demands are made on the homogeneity of the transparent carrier material and in this respect certain difficulties arise in the production of such information carriers because material residues, called "tags", stick to the pressing die and cause corresponding fault zones in the information carriers which are made from these dies. Other material discrepancies are caused by internal material stresses, bubbling or other harmful phenomena which arise during the production process.

SUMMARY OF THE INVENTION

It is the primary object of the present invention to provide an information carrier for signals that can be read optically and in which the aforementioned discrepencies or fault zones do not have an adverse effect on the reading process.

Starting with a disc-shaped information carrier of the general type mentioned above, the above objective is achieved, according to the present invention, by providing a disc-shaped base element which is made of opaque material, for example, and which exhibits a surface structure corresponding to the information contained therein on both sides by providing the two sides of the base element with a thin metallic coating which preserves the surface structure. Finally, the metallic coatings are covered with a layer of translucent material.

In one embodiment of the invention, the base element may be a thermosetting layer having the surface profile information storage structure on each side thereof.

In another embodiment of the invention, the base element may comprise an unprofiled disc which is provided with a lacquer coating on each side, the lacquer coating being embossed with the stored information and hardened by the application of radiant energy thereto, such as by ultraviolet light.

The unprofiled disc may be a transparent material, in which case the lacquer layers may be irradiated from one side, with the distant lacquer layer receiving the radiant energy via the other lacquer layer and the intermediate transparent layer. With an opaque central layer, such as aluminum, the lacquer layers must be irradiated from respective sides.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
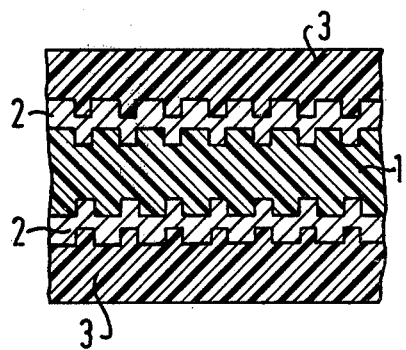
FIG. 1 is a greatly magnified sectional view of a portion of an information carrier constructed in accordance with the present invention.
Figure 3:
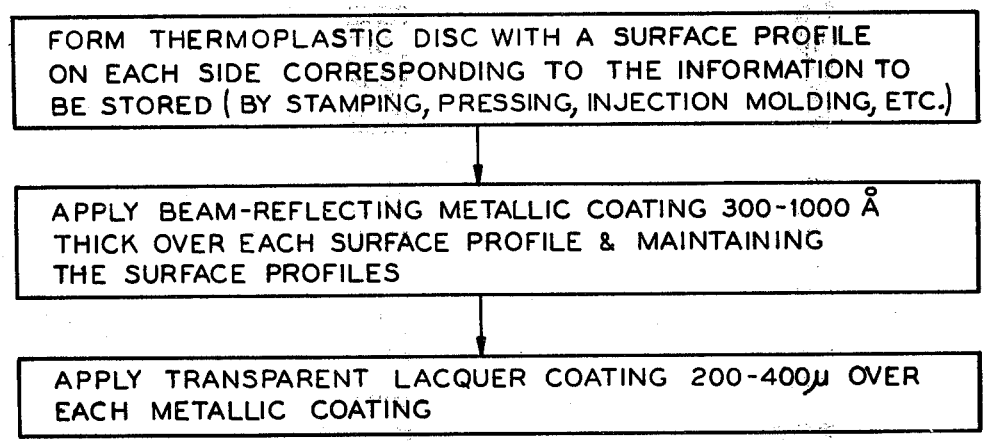
FIG. 3 is a flow chart which describes the process for producing an information carrier of the type illustrated in FIG. 1.

Referring to FIGS. 1 and 3, an information carrier and a process for producing the same are illustrated. The information carrier essentially comprises a disc-shaped base element 1 constructed of an opaque material. On each side of the base element 1, there is a surface structure corresponding to the information stored, the surface structure being a profile which is produced by stamping, pressing, injection molding or other suitable techniques. A beam-reflecting metallic coating 2 of roughly 300 to 1000 Å thickness is provided over each surface profile of the base element 1 by vapor deposition or chemical processes. It will be appreciated that the metallic coating reproduces and maintains the surface profile and therefore the stored information. Finally, a transparent lacquer coating 3 of about 200 to 400$\mu$ thickness is applied over each of the metallic coatings 2 in order to protect the information against stratches, dust and the like. The lacquer coating 3 form the entry and exit faces for the optical scanning beam. In comparison with the carrier molded under the influence of pressure and heat as known in the prior art, these lacquer coatings offer considerable advantages with regard to their optical properties because the chance of potential fault zones, caused by internal material stresses, bubbling or other harmful phenomena, are substantially reduced. Advantageously, the thickness of the lacquer coatings 3 is selected such that dust particles, scratches, etc, on the surface of the lacquer are so far outside the depth of focus of the optical reproduction system that such surface faults are no longer a nuisance. The total thickness of the information carrier is about 1 to 1.5 mm.

Figure 2:
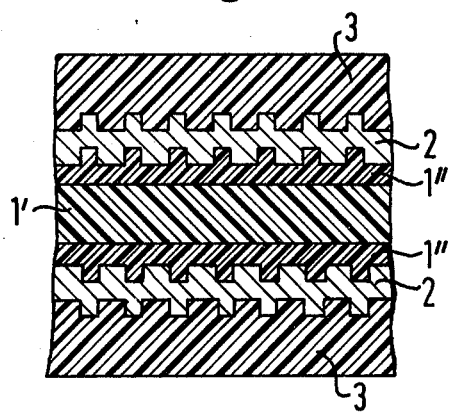
FIG. 2 is also a greatly magnified sectional view of a portion of another information carrier constructed in accordance with the present invention.
Figure 4:
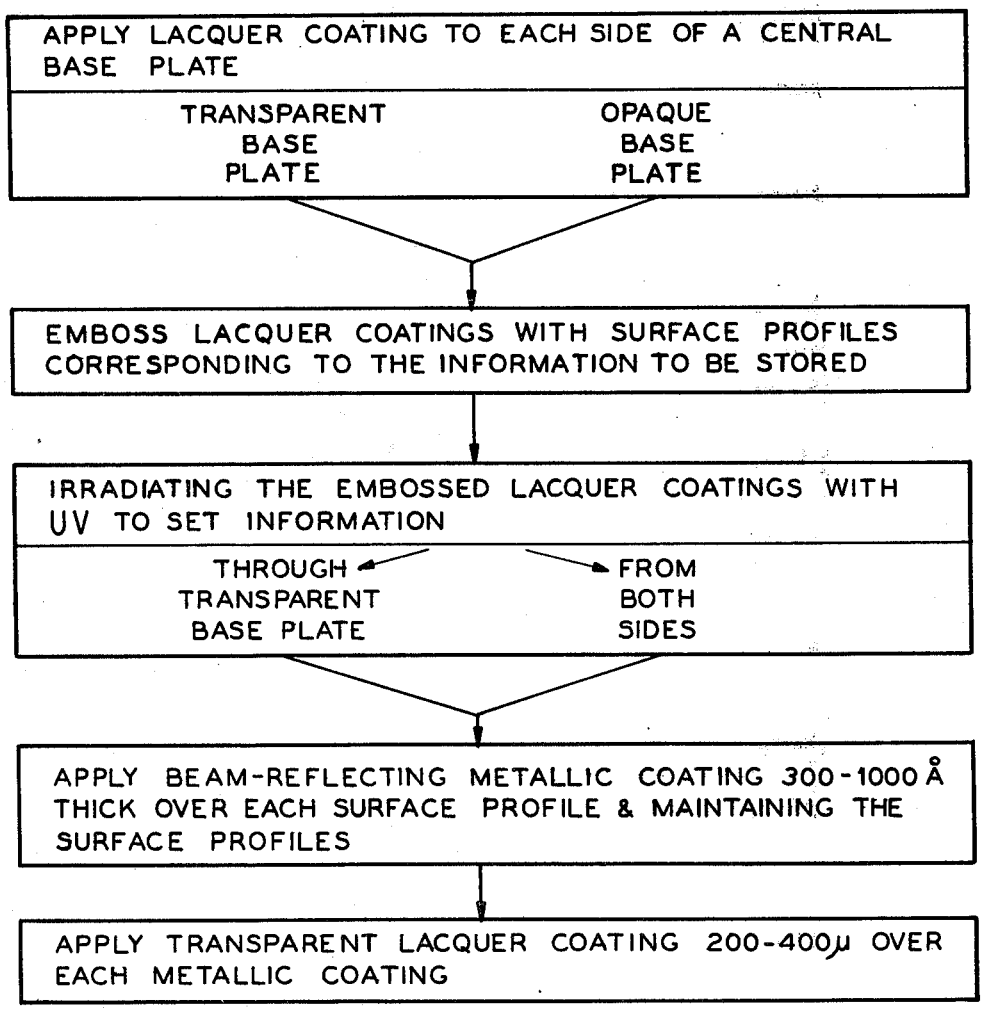
FIG. 4 is a flow chart for a process for producing an information carrier of the type illustrated in FIG. 2.

Referring now to FIGS. 2 and 4, another embodiment of the information carrier and its process of production are illustrated. With respect to structure, only the base element differs from the base element illustrated in FIG. 1. In FIG. 2, the basic material for the base element is an unprofiled disc-shaped base plate 1' which is provided on both sides with an information layer 1" reproducing the information structure. The reproduction of the information structure is carried out with the aid of an embossing die, for example. The information layers 1" are preferably constituted by lacquer coatings that can be set by the action of radiant energy, for example UV light. Expediently, a transparent base plate 1' is used with this production method because the radiation source can then act on both information layers simultaneously. In the alternative, however, an opaque base plate, made of aluminum for example, can also be used. In this case, the hardening process using ultraviolet light or other radiation is carried out, not through the base plate, but from both sides using a glass matrix in each case. After irradiation to harden the lacquer coatings and set the information, the element is processed in a manner similar to the device in FIG. 1 in that beam-reflecting metallic coatings 2 are applied over the information layers 1" reproducing and maintaining the same surface profiles, and the metallic coatings are then covered with transparent lacquer coatings 3.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A process for producing an information carrier, comprising the steps of:
    embossing opposite lacquer portions of a base element with respective surface profiles corresponding to information to be stored;
    exposing the embossed lacquer portions to radiant energy to set the profiles;
    applying metallic layers over the profiled surfaces while maintaining the same profile structures on the outer metallic surfaces; and
    applying transparent protective coatings over the metallic layers.

2. The process of claim 1, wherein the step of exposing is further defined as:
    irradiating the lacquer portions with ultraviolet light.

3. The process of claim 1, and further comprising the step of:
    prior to embossing, applying lacquer layers on respective sides of a transparent base plate to form the lacquer portions of base element.

4. The process of claim 3, wherein the step of exposing is further defined as:
    irradiating both lacquer layers from the same side with the more distant lacquer layer being irradiated through the closer lacquer layer and the transparent base plate.

5. The process of claim 1, and further comprising the step of:
    prior to embossing, applying lacquer layers on respective sides of an opaque base plate to form the lacquer portions of the base element.

6. The process of claim 5, wherein the step of exposing is further defined as:
    irradiating the lacquer layers from respective sides of the base element.

7. The process of claim 5, wherein the step of applying lacquer layers is further defined as:
    applying lacquer layers on respective sides of an opaque aluminum base plate.

8. A process for producing an information carrier, comprising the steps of:
    forming surface profiles on opposite surface portions of a base element to define the information to be stored;
    irradiating the profiled surface portions with ultraviolet light to harden the profiled surface portions;
    applying a beam-reflecting profiled metallic layer on each of the surface profiles while maintaining the same profiles on the outer surfaces of the metallic layers; and
    applying transparent protective coatings over the profiled surfaces of the metallic layers.

* * * * *